United States Patent [19]

Montone et al.

[11] 3,899,634

[45] Aug. 12, 1975

[54] VIDEO CONTROLLED POSITIONING METHOD AND APPARATUS

[75] Inventors: Liber J. Montone; Leonard J. Pietruszynski, both of Reading, Pa.

[73] Assignee: Western Electric Company, Incorporated, New York, N.Y.

[22] Filed: July 11, 1973

[21] Appl. No.: 378,307

Related U.S. Application Data

[63] Continuation of Ser. No. 147,051, May 26, 1971, abandoned.

[52] U.S. Cl........ 178/6.8; 178/DIG. 1; 178/DIG. 38

[51] Int. Cl............................................... H04m 7/18

[58] Field of Search......... 178/6.8, DIG. 1, DIG. 21, 178/DIG. 38, DIG. 37; 250/222 R; 356/156, 157

[56] References Cited

UNITED STATES PATENTS

| | | | |
|---|---|---|---|
| 3,207,904 | 9/1965 | Heinz | 250/222 |
| 3,419,674 | 12/1968 | Burns | 178/DIG. 21 |
| 3,562,423 | 2/1971 | Murphy | 178/DIG. 38 |
| 3,603,729 | 9/1971 | Sperber | 178/DIG. 38 |
| 3,749,830 | 7/1973 | Blitchington | 178/DIG. 1 |

OTHER PUBLICATIONS

Moore–High Speed Servo Positioner Bonds Mesa Transistors Optoelectronic Devices and Circuits, McGraw–Hill, 1964, pp. 2703.

*Primary Examiner*—Howard W. Britton
*Assistant Examiner*—Michael A. Masinick
*Attorney, Agent, or Firm*—G. W. Houseweart

[57] ABSTRACT

An apparatus for positioning an article utilizes a video signal of the article from a television camera to accurately position the article. Vertical and horizontal sync signals from the camera are used to generate selectively delayed signals forming one or more boundary markers. An edge of each boundary marker indicates a limit for an edge of the article. A coincidence of a boundary marker signal and the video signal of the article causes the article to be moved until there is no coincidence. The article may be positioned in X and Y coordinate directions as well as rotated in a Θ direction.

29 Claims, 11 Drawing Figures

INVENTORS
L. J. MONTONE
L. J. PIETRUSZYNSKI
By D. W. Marks
ATTORNEY

VIDEO CONTROLLED POSITIONING METHOD AND APPARATUS

This is a continuation of application Ser. No. 147,051 filed May 26, 1971, now abandoned.

BACKGROUND OF THE INVENTION

1. Field of the Invention

This invention relates to methods and apparatus for accurately positioning articles and, in particular, to the positioning of articles, such as beam leaded integrated circuits, beam leaded diodes, etc. During manufacturing procedures, the articles must be accurately positioned so that multiprobes, bonding tools, etc. may accurately engage contact leads or other portions of each article.

2. Description of the Prior Art

In the past, a wide variety of techniques have been used to position articles with varying degrees of precision. Among the simpler of these techniques are the manual positioning systems utilizing a microscope with cross hairs or similar indicia rigidly fixed in the optics. Suitable positioning mechanisms, such as manually operated wormscrews, are operated to move a stage upon which the article is placed to accurately position the article in alignment with the cross hairs. In operations where small quantities of articles of simple geometry are being handled, these systems are excellent both economically and in performance, but as the articles become more complex in detail or larger quantities are handled, these systems become slow, costly, tedious and questionable in results.

Other prior art techniques utilizes photocell or photomultiplier tubes which sense various portions of the article for reflected or transmitted light to control voltages to motors which drive a movable stage. Such systems, while working well with large articles or articles having a simple geometry, are not readily adapted to positioning articles which are microscopic in dimension or complex in geometry. Also varying reflectivity and/or absorbency characteristics of articles cause such systems to operate with less accuracy.

Other prior art positioning systems utilize video signals generated by television cameras for positioning articles. One class of television positioning systems, utilizes a computer to compare various portions of the field with a programmed memory. The field is divided into many subdivisions. The presence or absence of a video signal in each subdivision is compared to the programmed memory to produce signals to position the articles. Such systems are complex and expensive where very accurate positioning is required.

Another class of prior art television positioning systems uses various phase characteristics of the video signal to center an article with respect to the television camera. While such systems are useful, they do not generally produce the accuracy that is necessary for small and complex articles.

Still another prior art television positioning system is described in U.S. Pat. No. 3,749,830 issued July 31, 1973 to F. H. Blitchington, Jr. and assigned to the assignee hereof. This system senses an article or pattern associated with the article to produce a first pulse having a time relationship relative to the horizontal and vertical sync pulses indicating the actual position of the article. A timing circuit controlled by the vertical and horizontal sync pulses generates vertical cross hair pulses and horizontal cross hair pulses to which the first pulse is compared. The article is moved until the first pulse has a predetermined time relationship to the vertical and horizontal cross hair pulses. The present invention is patentable over the system described in the Blitchington application.

SUMMARY OF THE INVENTION

An object of the invention is a new and improved method and apparatus utilizing television video signals for positioning articles.

Another object of the invention is a positioning method and apparatus wherein the edges of the articles abut, but are not coincident with the edges of selectively generated boundary markers to accurately position the articles.

In accordance with these and other objects, the invention includes sensing a coincidence of a video signal of the article and a video signal of a boundary marker to move the article until the video signal of the article and the video signal of the boundary marker do not coincide. Thus, an edge of the boundary marker defines a limit for an edge of the article.

Additionally, the invention utilizes a first boundary marker having predetermined horizontal a vertical dimensions for positioning the article in a first direction and a second boundary marker having predetermined horizontal and vertical dimensions for positioning the article in a second direction. The article is initially positioned so that the video signal of the article coincides with both the video signals of the first and second boundary markers. Movement of the article in the first and second directions until the video signals of the first and second boundary markers do not coincide with the video signal of the article results in the article being accurately positioned.

Further, the invention utilizes a plurality of boundary markers for positioning the article in X and Y directions and/or rotating in the $\theta$ direction.

DETAILED DESCRIPTION

Figure 1:
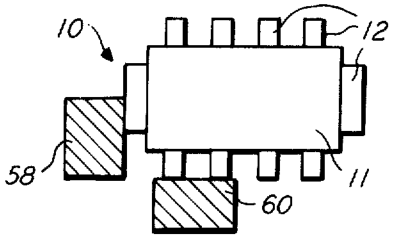
FIG. 1 shows an article, such as a beam leaded integrated circuit, which may be positioned in accordance with the invention.
Figure 2:
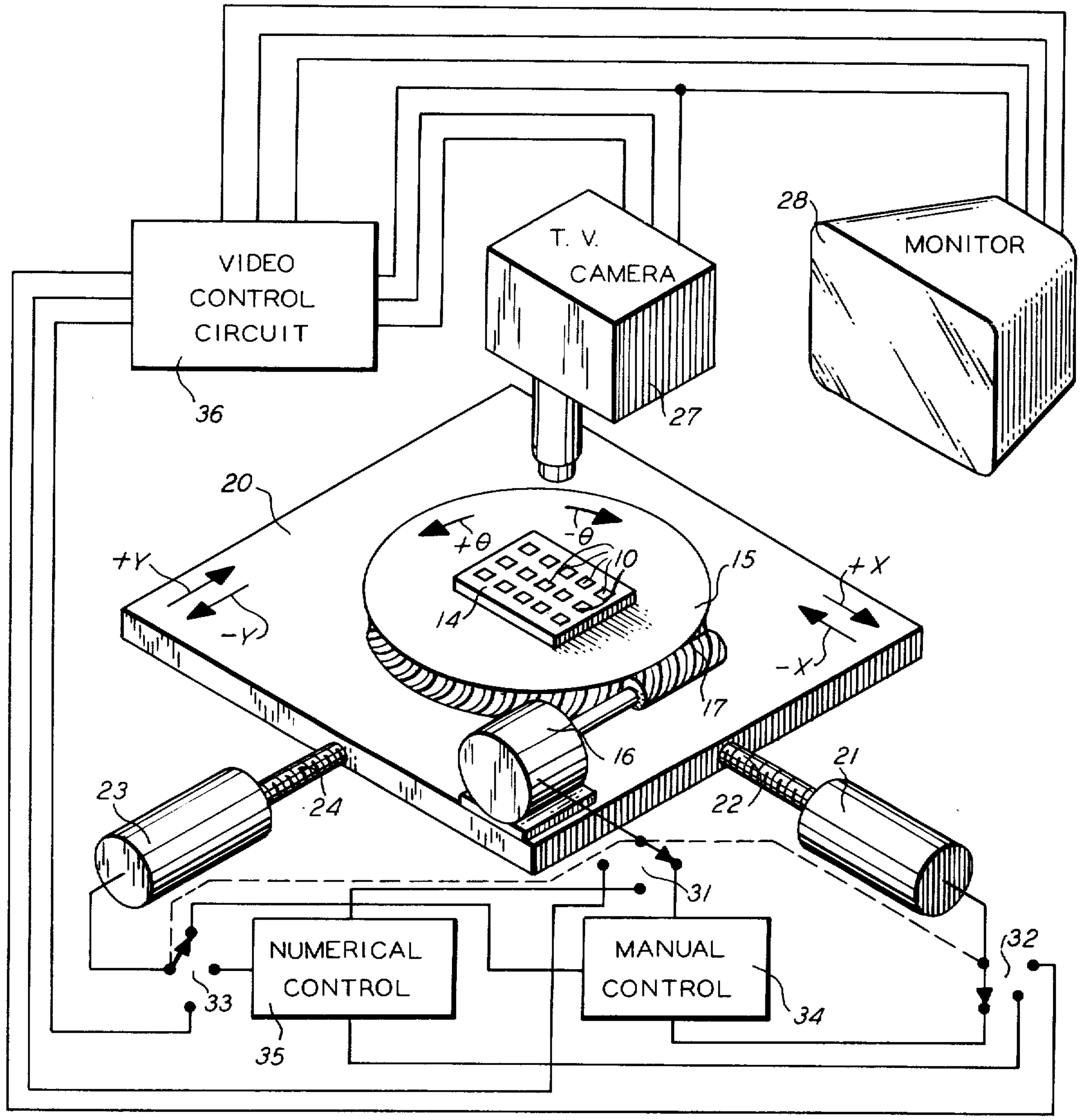
FIG. 2 illustrates a system for positioning articles in accordance with the invention.

Referring to FIG. 1, there is shown an article 10 having a body 11 with a plurality of leads or tabs 12—12, such as beam leads extending therefrom. Referring to FIG. 2, there is shown an apparatus for accurately positioning a plurality of the articles 10—10 relative to equipment (not shown), such as bonding tools, testing probes, pickup devices, etc. A plurality of the articles 10—10 are positioned on a holder 14 which is held on a rotary table 15 by facilities such as a vacuum chuck. The rotary table 15 is selectively rotated by a motor 16 driving a wormscrew 17 meshing with a geared edge of the rotary table 15. The motor 16 and the rotary table 15 are mounted on a X and Y movable table 20 which is moved in the X direction by a motor 21 driving a screw 22 and in the Y direction by a motor 23 driving a screw 24. Positioning motors and screw arrangements are well known. One example of a suitable motor is SLO-SYN stepping motor model SS-50 manufactured by Superior Electric of Bristol, Conn.

For the purposes of illustration in this description, forward direction $+\theta$ and reverse direction $-\theta$ are shown for the rotary table 15. Forward directions +X and +Y and reverse directions −X and −Y are shown for the table 20.

A television camera 27 is positioned over the table 15 to view one or more of the articles 10 on the holder 14. The article viewed by the camera 27 is displayed on a suitable monitor 28. The camera 27 may be any conventional television camera, such as modle MTC 12 sold by Concord of Japan which produces video signals along with horizontal and vertical sync signals. Also the camera 27 is equipped with a lens or optical system to produce a suitably enlarged representation of an article 10. The monitor 28 may be any suitable monitor which will display the video signal, such as model VM903 manufactured by Shibaden of Japan.

Three ganged switches 31, 32 and 33 selectively connect the respective motors 16, 21 and 23 to a manual positioning circuit 34, numerical control equipment 35 or a video control circuit 36. The manual control circuit 34 is any conventional circuit which applies suitable signals to the motors 16, 21 and 23 by manually operated switches to drive the motors in selected directions. Such circuitry is conventional and well known in the art and no further description is deemed necessary. Also, the numerical control circuit 35 is conventional and well known in the art. Such circuits may include suitable magnetic or punched tape readers along with registers or counters and position feedback indicators to control the position of the tables 20 and 15. The manual control circuit 34 and numerical control circuit 35 are generally used to coarsely position the tables 15 and 20. The video control circuit 36 is used to accurately position an article 10. The switches 31–33 may be replaced by automatically operated equipment. For example, the numerical control 35 may coarsely position the tables 15 and 20 and then automatically actuate the video control circuit to accurately position the article 10. A less expensive system would not include the numerical control equipment, but would rely upon an operator to coarsely position each article 10.

Figure 3:
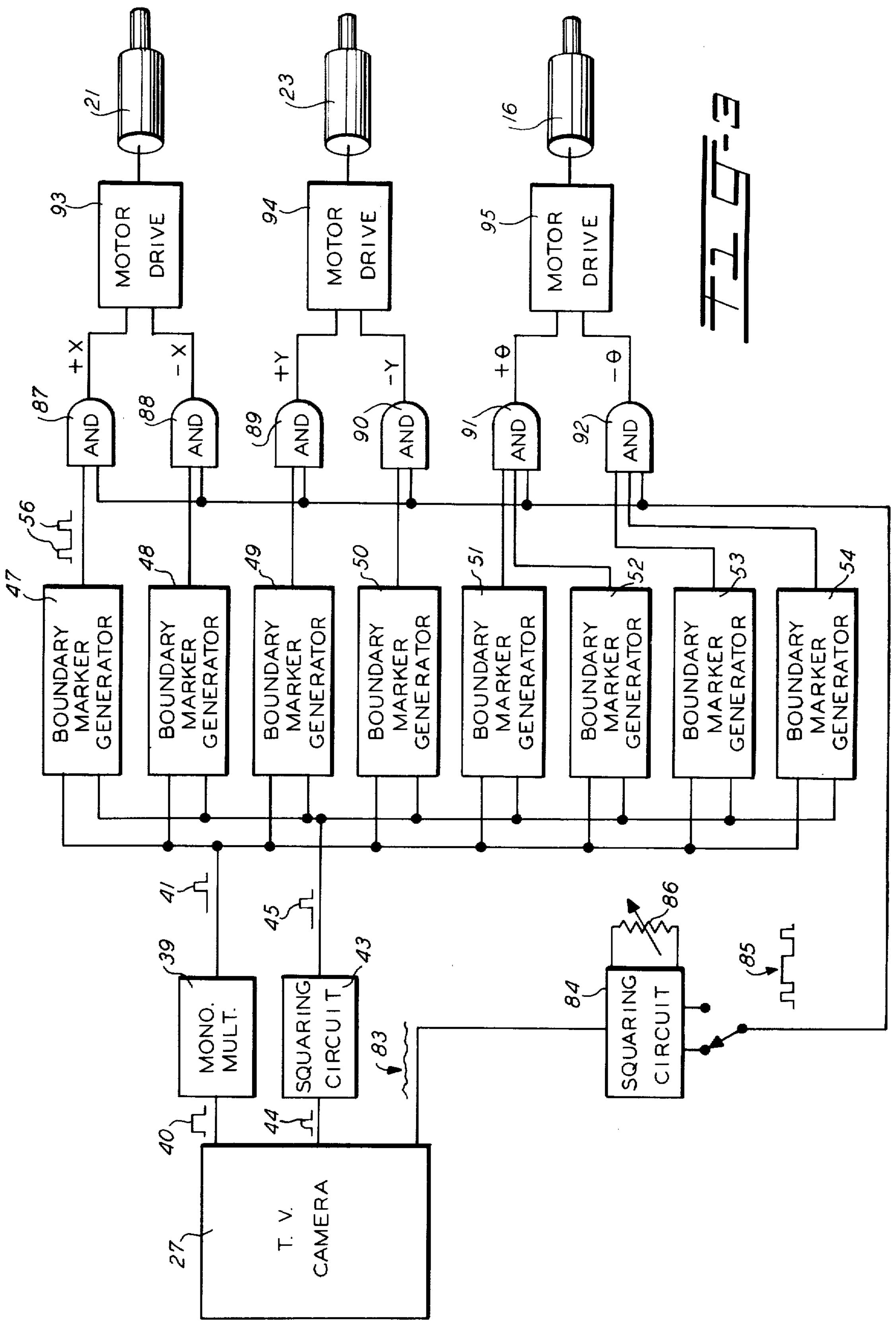
FIG. 3 is a block diagram of the video control circuit of the system shown in FIG. 2.
Figure 4:
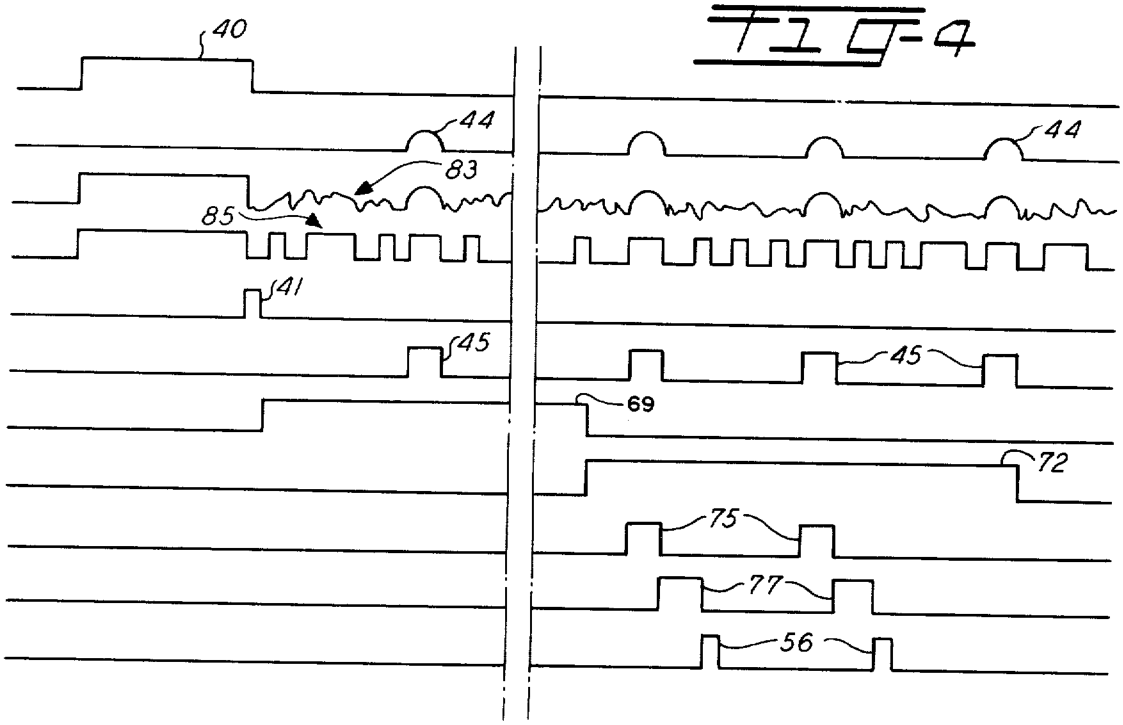
FIG. 4 shows wave forms generated by various portions of the circuitry of FIG. 3.
Figure 7:
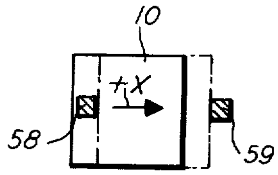
FIG. 7 illustrates the use of a pair of boundary markers for positioning an article in a X direction.
Figure 8:
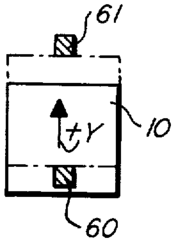
FIG. 8 illustrates the use of a pair of boundary markers for positioning an article in a Y direction.
Figure 9:
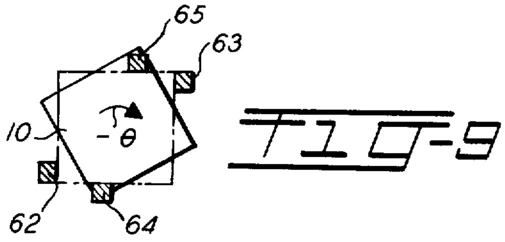
FIG. 9 illustrates the use of four boundary markers to position an article in a $\theta$ direction.

Referring to FIG. 3, there is shown a block diagram of the video control circuit 36 in FIG. 2. FIG. 4 shows the various time relationships of pulses and signals in the video control circuit 36. The vertical sync pulses 40 of the camera 27 are applied to a monostable multivibrator 39 which is triggered by the trailing edge of the vertical sync pulse 40 to produce pulses 41. The horizontal sync pulses 44 from the camera 27 are applied to a squaring circuit 43, such as a Schmidt trigger, to produce pulses 45. The pulses 41 and 45 from the respective monostable multivibrator 39 and squaring circuit 43 are applied to respective inputs of a plurality of boundary marker generators 47–54. Each of the boundary marker generators 47–54 generate video signals 56—56 which are delayed from the vertical sync and horizontal sync pulses 41 and 45. Referring to FIG. 7, the boundary marker signals produced by the generators 47 and 48 when displayed on the monitor 28 show respective boundary markers 58 and 59. The boundary markers generated by the generators 49 and 50 are shown in FIG. 8 as boundary markers 60 and 61, respectively. The boundary markers generated by the generators 51–54 are shown in FIG. 9 as boundary markers 62–65, respectively. An edge of each of the boundary markers 58–65 define a limit for the position of the article 10; that is, the video display of the article 10 must not overlap any of the boundary markers 58–65.

Figure 5:
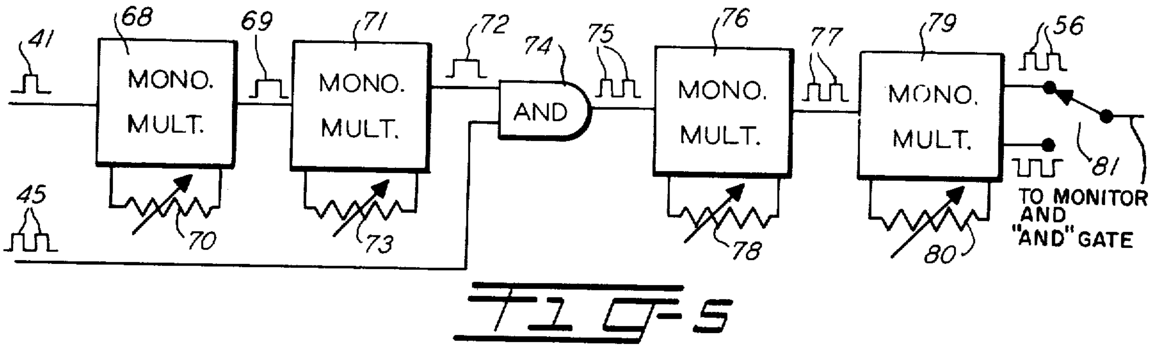
FIG. 5 is a block diagram of one type of boundary marker generator which may be used in the circuit shown in FIG. 3.

Referring to FIG. 5, there is shown a typical boundary marker generator. The time relationships of various signals in the generator are illustrated in FIG. 4. A pulse 41 is applied to the input of a first monostable multivibrator 68 to trigger the monostable multivibrator 68 on the trailing edge of the pulse 41 to produce a pulse 69. The length and duration of the pulse 69 is controlled by a variable resistor 70 which is part of the monostable multivibrator circuit 68. The value of the resistor 70 determines the vertical position of the boundary marker. The pulse 69 is applied to a monostable multivibrator 71 to trigger the monostable multivibrator 71 at the trailing edge of the pulse 69 to produce a pulse 72. Similarly, the duration of the pulse 72 is determined by the value of an adjustable resistor 73 which determines the vertical dimension or width of the boundary marker displayed on the monitor 28. The pulse 72 is applied to a first input of an AND gate 74 and pulses 45—45 from the squaring circuit 43 are applied to a second input of the AND gate 74 to produce pulses 75—75 when there is a coincidence of the pulses 45—45 and the pulse 72. The pulses 75—75 from the AND gate 74 are applied to the input of a monostable multivibrator 76 to trigger the monostable multivibrator 76 on the trailing edges of the pulses 75—75 to produce pulses 77—77. A variable resistor 78 in the monostable multivibrator 76 determines the width of the pulses 77—77 or the horizontal position of the boundary marker. The pulses 77—77 are applied to inputs of the monostable multivibrator 79 to trigger the monostable multivibrator 79 on the trailing edges of the pulses 77—77 to produce the pulses 56—56. The width of the pulses 56—56 or the horizontal dimension of the marker are determined by a variable resistor 80 of the monostable multivibrator 79. A switch 81 may be provided to select either the positive or negative outputs of the monostable multivibrator 79 in accordance with a desire to have either a black or white boundary marker and this selected output is applied to the monitor 28 (FIG. 2) and the respective AND gate (FIG. 3).

Referring back to FIG. 3, the video signal 83 is applied to a squaring circuit 84, such as a Schmidt trigger circuit, to eliminate gray areas in the signal and produce a squared signal 85 (see also FIG. 4). The squaring circuit 84 may be adjusted by a resistor 86 to provide for varying levels of response. For example, the body 11 and leads 12—12, just the body 11, or just the leads 12, may be white or black with the rest the opposite. Also, the desired positive or inverted output of the squaring circuit 84 may be selected depending upon the requirements of the circuitry.

The squared video signal 85 is applied to first inputs of AND gates 87–92. The boundary marker signals generated by the generators 47–50 are applied to second inputs of the AND gates 87–90, the boundary marker signals generated by generators 51 and 52 are applied to second and third inputs of the AND gate 91 and the boundary marker signals generated by the generators 53 and 54 are applied to the second and third inputs of the AND gate 92. The outputs of the AND gates 87 and 88 are applied to a motor drive circuit 93 to operate the motor 21 in forward and reverse directions, the outputs of the AND gates 89 and 90 are applied to a motor drive circuit 94 to operate the motor 23 in forward and reverse directions and the outputs of the AND gates 91 and 92 are applied to a motor drive circuit 95 to operate the motor 16 in forward and reverse directions. The motor drive circuits 93-95 are conventional circuits designed to convert the pulse input signals from the AND gates 87-92 to suitable currents and voltages for the motors 21, 23 and 16. One example of such a circuit is SLO-SYN translator module STM-1800 generally available from the same sources as the above-mentioned SLO-SYN stepping motor.

Referring to FIGS. 7–9, there is shown the video monitor representation of the article 10 and boundary markers 58–65 generated by the respective boundary marker generators 47–54. The article 10 is represented by a square which could be the outer dimensions of the leads 12—12, or the body 11 which is determined by the squaring circuit 84. If any of the boundary marker signals from the generators 47–50 coincide with the squared video signal 85 of the article 10, a respective AND gate 87–90 will produce an output signal to move the table 20 in a selected direction until there is no coincidence of a boundary marker signal and the video signal 85. For example in FIG. 7, the video signal of the article 10 overlaps or coincides with the boundary marker 58. Thus the AND gate 87 produces output signals to energize the motor drive 93 to operate the motor 21 and move the table 20 in the +X direction. The AND gate 87 will continue to produce signals until the video signal of article 10 no longer coincides with the boundary marker 58 and the edge of the video representation of the article 10 abuts but does not overlap the edge of the marker 58 as shown in phantom. Similarly, as shown in FIG. 8, overlapping of the boundary marker 60 with the video representation of the article 10 causes the motor 23 to move the article 10 in the +Y direction until the edge of the article 10 is at the edge of the boundary marker 60 as shown in phantom.

If the article is rotated, as shown in FIG. 9, so that it is not properly oriented with the apparatus, the video representation of the article 10 overlaps a pair of the boundary markers 62–63 or 64–65. Overlapping the pair of the boundary markers 64 and 65 causes the AND gate 92 to produce an output signal and operate the motor 95 to move the table 15 in a $-\theta$ direction until the article 10 is properly oriented with respect to the apparatus.

It is seen that the article 10 may be very accurately positioned relative to the apparatus. Since different articles 10 may vary slightly in dimension, the markers 58 and 59 are spaced sufficiently to allow for this variation. Similarly, the spacing of the markers 60–65 is suitably selected. The accuracy of the positioning may be improved by assuring that the representations of all the articles are abutting the same boundary markers. This may be done by slightly moving the article in −X, −Y and $-\theta$ directions after the article has been first positioned and then allowing the article to be moved back into position.

Figure 6:
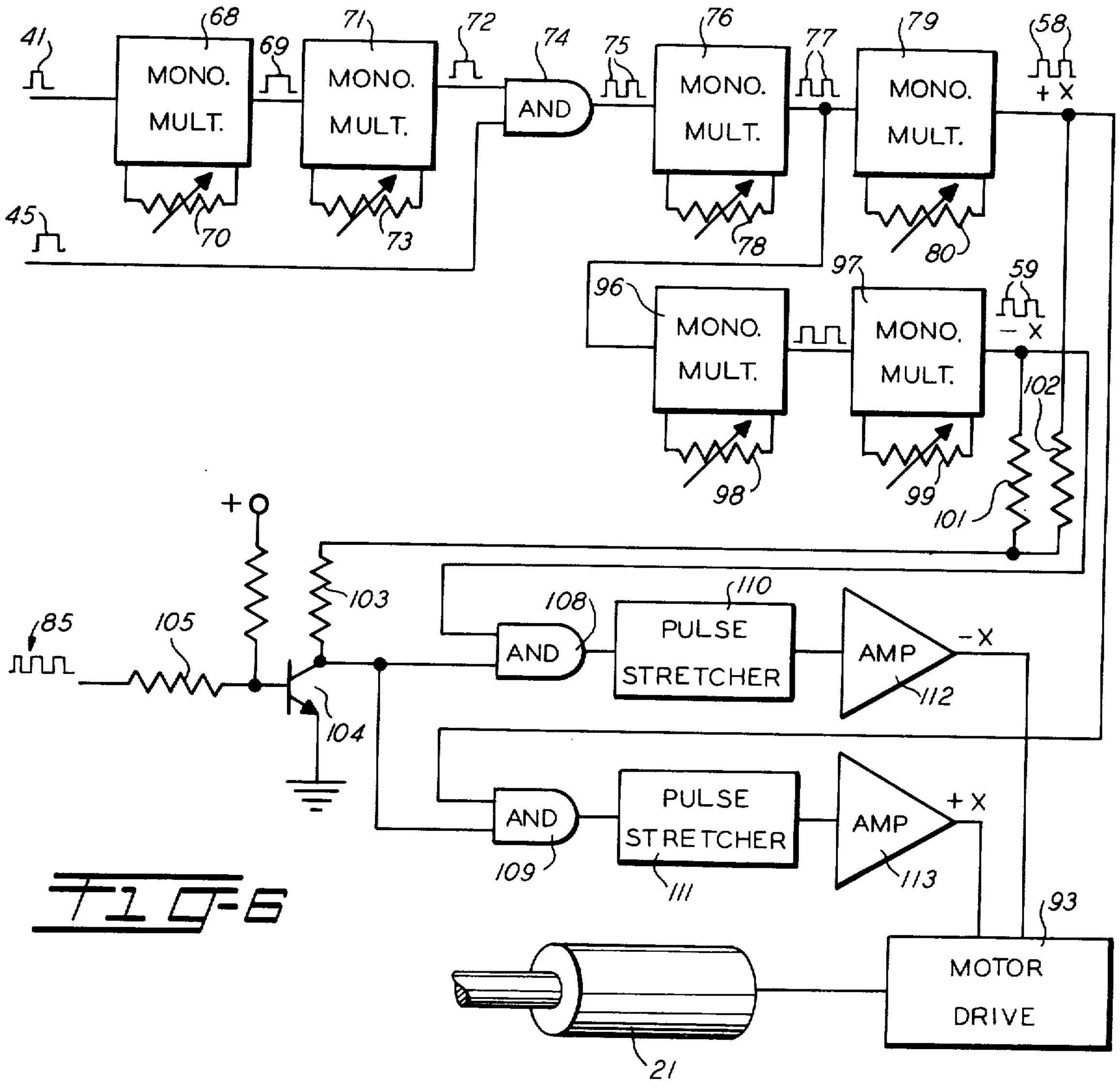
FIG. 6 is a block diagram of an alternate embodiment of a boundary marker generator for generating both reverse and forward X boundary markers to operate the X drive motor.

In FIG. 6 there is shown an alternate embodiment for the boundary marker generators 47 and 48 and the AND gates 87 and 88. The circuitry utilizes the monostable multivibrators 68, 71, 76 and 79 and the AND gate 74 to produce the +X marker signal 58 in the same manner as shown in FIG. 5. However, the −X marker signal 59 is produced by two serially connected monostable multivibrators 96 and 97 connected to the output of the monostable multivibrator 76. The monostable multivibrators 96 and 97 having variable resistors 98 and 99 produce a delayed −X marker signal 59 in the same manner as the monostable multivibrators 76 and 79. The markers 58 and 59 are summed through two resistors 101 and 102 and applied through a resistor 103 to the collector of a transistor 104. The video signal 85 from the squaring circuit 84 is applied through a resistor 105 to the base of the transistor 104. The transistor 104 is normally biased conductive so that only the presence of a 0 level signal indicating the presence of an article in the video signal renders the transistor 104 conductive. If there is a coincidence of a 0 level signal on the base of the transistor 104 and one of the outputs from either the marker signals 58 and 59, an output pulse is produced on the collector of the transistor 104 which is applied to first inputs of the AND gates 108 and 109. The second inputs of the AND gates 108 and 109 are connected to the outputs of the respective monostable multivibrators 79 and 97 to detect which boundary marker 58 or 59 overlaps the article. The outputs of the AND gates 108 and 109 are applied to respective pulse stretching circuits 110 and 111, and amplifier circuits 112 and 113 to the motor drive circuit 93 to operate the motor 21.

Figure 10:
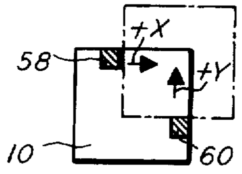
FIG. 10 illustrates a simplified version using only two boundary markers for positioning an article in both the X and Y directions.
Figure 11:
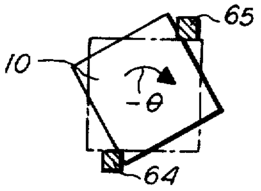
FIG. 11 illustrates a simplified version using only two boundary markers for positioning an article in the $\theta$ direction.

Some of the circuitry in FIG. 3 may be eliminated without destroying the accuracy of the positioning. For example, if it is desirable to only position the X and Y direction, the generators 48, 50–54 may be eliminated along with the AND gates 88, 90–92. As illustrated in FIG. 10, the article would be coarsely positioned by the operator or the numerical control 35 so that it is over the boundary markers 58 and 60. Then the motors 21 and 23 would be operated by signals from AND gates 87 and 89 to move the article 10 into position. Similarly, the generators 51 and 52 and the AND gate 91 may be eliminated, and as shown in FIG. 11, the article 10 would be accurately positioned by the operator or numerical control equipment so that it overlaps both the boundary markers 64 and 65. The motor 16 would then be operated by signals from the AND gate 91 to move the article until it is accurately positioned by the boundary markers 64 and 65.

The above-described embodiments of the invention are simply illustrative of the principles of the invention and many embodiments may be devised without departing from the scope and spirit of the invention. For example, gates 87–92, 74, 108 and 109 are described as AND function gates. It is well known that with proper selection of logic levels a wide variety of different function gates, such as NOR, NAND, etc., can be made to perform the same function.

What is claimed is:

1. A method of positioning an article relative to an apparatus comprising:

generating a first video signal of the article;

generating a second video signal of a first boundary marker having adjustable vertical and horizontal dimensions with an edge of the first boundary marker indicating a limit for a first edge of the article;

generating a third video signal of a second boundary marker having adjustable vertical and horizontal dimensions with an edge of the second boundary marker indicating a limit for a second edge of the article;

displaying the first, second and third video signals simultaneously on a monitor;

moving the first and second boundary markers to respective selected positions on the monitor;

sensing a coincidence of the first and second video signals;

moving the article in a first direction in response to the sensed coincidence of the first and second video signals;

sensing a coincidence of the first and third video signals; and moving the article in a second direction in response to the sensed coincidence of the first and third video signals to position the article.

2. A method as recited in claim 1 wherein the second and third video signals are generated such that the first and second boundary markers are horizontally aligned with each other.

3. A method as recited in claim 1 wherein the second and third video signals are generated such that the first and second boundary markers are vertically aligned with each other.

4. A method as recited in claim 1 wherein the first and second directions are forward X and reverse X directions.

5. A method as recited in claim 1 wherein the first and second directions are forward and reverse rotary directions.

6. A method as recited in claim 1 wherein the first and second directions are X and X mutually perpendicular directions.

7. A method as defined in claim 6 wherein the article is initially positioned so that there is a coincidence of the first and second video signals and a coincidence of the first and third video signals and wherein the article is moved until the coincidence is essentially eliminated.

8. A method of positioning an article relative to an apparatus by moving the article in perpendicular X and Y directions comprising:

generating a first video signal of the article;

generating second and third video signals of respective first and second boundary markers having predetermined X and Y dimensions with facing edges of the first and second boundary markers indicating limits for respective first and second opposite edges of the article in reverse X and forward X directions;

generating fourth and fifth video signals of respective third and fourth boundary markers having predetermined X and Y dimensions with facing edges of the third and fourth boundary markers indicating limits for respective third and fourth opposite edges of the article in reverse Y and forward Y directions;

displaying the first, second, third, fourth, and fifth video signals simultaneously on a monitor;

moving the first, second, third and fourth boundary markers to respective selected positions on the monitor;

moving the article in the forward X direction if there is a coincidence of the first and second video signals;

moving the article in the reverse X direction if there is a coincidence of the first and third video signals;

moving the article in the forward Y direction if there is a coincidence of the first and fourth video signals;

moving the article in the reverse Y direction if there is a coincidence of the first and fifth video signals.

9. A method as defined in claim 8 wherein the article is moved so that there is a coincidence of the first and second video signals and a coincidence of the first and fourth video signals.

10. A method as recited in claim 8 wherein the article is moved until the first video signal coincides with none of the second, third, fourth, and fifth video signals.

11. Apparatus for positioning an article in a X-Y plane comprising:

television camera means for generating a vertical sync signal, a horizontal sync signal and a first video signal of the article;

means for holding and moving the article in X and Y directions;

means controlled by the vertical and horizontal sync signals for generating a second video signal of a first boundary marker having four edges with at least one edge perpendicular to the X direction indicating a limit for a first edge of the article;

means for moving the first boundary marker to a first selected position;

means responsive to a coincidence of the first and second video signals for energizing the holding and moving means to move the article in the X direction in response to sensed coincidence of the first and second video signals;

means controlled by the vertical and horizontal sync signals for generating a third video signal of a second boundary marker having four edges with at least one edge perpendicular to the Y direction indicating a limit for a second edge of the article;

means for moving the second bounary marker to a second selected position; and means responsive to a coincidence of the first and third video signals for energizing the holding and moving means to move the article in the Y direction in response to sensed coincidence of the first and third video signals.

12. Apparatus for positioning an article in a X and Y plane comprising:

television camera means for generating a vertical sync signal, a horizontal sync signal and a first video signal of the article;

means for moving the article in a forward X direction, a reverse X direction, a forward Y direction and a reverse Y direction;

means controlled by the vertical and horizontal sync signals for generating second and third video signals of respective first and second boundary markers having facing edges indicating limits for first and second opposite edges of the article;

means controlled by the vertical and horizontal sync signals for generating fourth and fifth video signals of respective third and fourth boundary markers having facing edges indicating limits for third and fourth opposite edges of the article;

said first, second, third and fourth boundary markers having predetermined vertical and horizontal dimensions;

means for moving the first, second, third and fourth boundary markers to respective selected positions;

means responsive to a coincidence of the first and second video signals for energizing the article moving means to move the article in the forward X direction;

means responsive to a coincidence of the first and third video signals for energizing the article moving means to move the article in the reverse X direction;

means responsive to a coincidence of the first and fourth video signals for energizing the article moving means to move the article in the forward Y direction; and means responsive to a coincidence of the first and fifth video signals for energizing the article moving means to move the article in the reverse Y direction.

13. Apparatus as defined in claim 12 which includes:

means for energizing the moving means to position the article such that there is a coincidence of the first and second video signals and a coincidence of the first and fourth video signals.

14. Apparatus for positioning an article comprising:

television camera means for generating a first video signal of the article, a vertical sync signal and a horizontal sync signal;

means responsive to the vertical sync signal and the horizontal sync signal for generating a second video signal representing a two-dimensional position marker for the article;

means for adjusting the vertical and horizontal dimensions of the marker signal;

means for superimposing the first signal representing the article and the second signal representing the marker;

means for moving the position of the entire marker signal relative to the first video signal; and means responsive to a coincidence of the first video signal and the second video signal for positioning the article.

15. Apparatus as recited in claim 14 wherein the means for positioning the article includes means for moving the article to reduce said coincidence of the first video signal and the second video signal sufficient for accurately positioning the edge of the article with respect to the marker.

16. Apparatus as recited in claim 14 wherein the means for moving the article includes means for moving the article until there is no coincidence of the video signal and the marker signal.

17. Apparatus for positioning an article comprising:

television camera means for generating vertical sync signals, horizontal sync signals, and a first video signal of the article;

means responsive to the vertical sync signals and the horizontal sync signals for generating a second video signal representing a first two-dimensional position marker having an edge defining a limit for a first edge of the article;

means responsive to the vertical sync signals and the horizontal sync signals for generating a third video signal representing a second position marker having an edge defining a limit for a second edge of the article;

said first and second position markers having predetermined vertical and horizontal dimensions;

means for superimposing the first, second and third video signals;

means for moving the positions of both position markers relative to the position of the article as represented by the first video signal;

means responsive to a coincidence of the first video signal and the second video signal for moving the article in a first direction for positioning the article; and means responsive to a coincidence of the first and third video signals for moving the article in a second direction to position the article.

18. Apparatus as defined in claim 17 wherein each of the second video signal generating means and the third video signal generating means includes:

first variable delay means operated by the vertical sync signal for producing a first pulse having a selected width corresponding to the vertical dimension of the boundary marker;

gating means responsive to a coincidence of the horizontal sync signal and the first pulse for producing a second pulse; and second variable delay means actuated by the second pulse for generating the video signal containing at least one pulse having a selected width corresponding to the horizontal dimension of the boundary marker.

19. Apparatus as defined in claim 17 wherein each of the energizing means includes:

an emitter-grounded transistor;

a resistor connecting the collector of the transistor to the respective second or third video signal generating means; and means for squaring the first video signal and for applying the squared first video signal to the base of the transistor.

20. Apparatus for positioning an article comprising:

means for generating first video signals representing an image of the article;

means for generating second video signals representing an image of a first two-dimensional position marker;

means for generating third video signals representing an image of a second two-dimensional position marker;

means for sensing a coincidence of the first and second video signals and of the first and third video signals; and means for moving the article in response to the sensed coincidence.

21. Apparatus as recited in claim 20 including means for altering the second and third video signals to adjust the dimensions of the position markers.

22. Apparatus as recited in claim 20 including means for altering the second and third video signals to move the markers.

23. Apparatus as recited in claim 20 wherein the first position marker indicates a limit for a first edge of the article, and the second position marker indicates a limit for a second edge of the article.

24. Apparatus as recited in claim 20 wherein the moving means includes means for moving the article in a direction to reduce the sensed coincidence.

25. Apparatus as recited in claim 24 wherein the moving means includes means for moving the article until the coincidence is eliminated.

26. A method of positioning an article comprising:

generating first video signals representing an image of the article;

generating second video signals representing an image of a first two-dimensional position marker;

generating third video signals representing an image of a second two-dimensional position marker;

sensing a coincidence of the first and second video signals and of the first and third video signals; and moving the article in response to the sensed coincidence to position the article.

27. A method as recited in claim 26 wherein the article is moved in a direction to reduce the coincidence.

28. A method as recited in claim 27 wherein the article is moved until the coincidence is eliminated.

29. A method of positioning an article comprising:

generating first video signals representing the article;

generating second video signals representing a first position marker having adjustable vertical and horizontal dimensions;

generating third video signals representing a second position marker having adjustable vertical and horizontal dimensions;

sensing a coincidence of the first and second video signals and of the first and third video signals; and moving the article in response to the sensed coincidence.

* * * * *